(12) United States Patent
Kruizinga et al.

(10) Patent No.: US 10,508,951 B2
(45) Date of Patent: Dec. 17, 2019

(54) HIGH RESOLUTION BROADBAND MONOLITHIC SPECTROMETER AND METHOD

(71) Applicant: Nederlandse Organisatie voor toegepast-natuurwetenschappelijk onderzoek TNO, The Hague (NL)

(72) Inventors: Borgert Kruizinga, The Hague (NL); Hedser van Brug, The Hague (NL); Frerik van Beijnum, The Hague (NL)

(73) Assignee: Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 0 days.

(21) Appl. No.: 16/068,316

(22) PCT Filed: Jan. 6, 2017

(86) PCT No.: PCT/NL2017/050004
§ 371 (c)(1),
(2) Date: Jul. 5, 2018

(87) PCT Pub. No.: WO2017/119812
PCT Pub. Date: Jul. 13, 2017

(65) Prior Publication Data
US 2019/0017869 A1    Jan. 17, 2019

(30) Foreign Application Priority Data
Jan. 8, 2016   (EP) .................................... 16150569

(51) Int. Cl.
*G01J 3/02*     (2006.01)
*G01J 3/28*     (2006.01)
(Continued)

(52) U.S. Cl.
CPC .......... *G01J 3/0208* (2013.01); *G01J 3/0259* (2013.01); *G01J 3/18* (2013.01); *G01J 3/2823* (2013.01); *G01J 2003/1204* (2013.01)

(58) Field of Classification Search
CPC .......... G01J 3/0208; G01J 3/18; G01J 3/2823; G01J 3/0259; G01J 2003/1204; G01J 3/021; G01J 2003/1282
See application file for complete search history.

(56) References Cited

U.S. PATENT DOCUMENTS

| 5,754,290 A | 5/1998 | Rajic et al. |
| 2010/0309454 A1* | 12/2010 | Zhang ....................... G01J 3/02 356/39 |

FOREIGN PATENT DOCUMENTS

| EP | 2857810 A1 | 4/2015 |
| FR | 2847978 A1 | 6/2004 |
| WO | WO 98/01729 A1 | 1/1998 |

OTHER PUBLICATIONS

European Patent Office, International Search Report in corresponding International Application No. PCT/NL2017/050004 dated Jun. 2, 2017 (3 pages).

* cited by examiner

*Primary Examiner* — Hina F Ayub
(74) *Attorney, Agent, or Firm* — Leydig, Voit & Mayer, Ltd.

(57) ABSTRACT

A monolithic spectrometer (10) for spectrally resolving light (L), comprises a body (2) of solid material having optical surfaces (3,4,5,6a-6c,8) configured to guide the light (L) along an optical path (E1,E2,E3,E4) inside the body (2). The optical surfaces of the body (2) comprise a segmented focusing surface (6a,6b) comprising first and second continuously functional optical shapes (Ca,Cb) to focus received parts of respective beams (La,Lb) onto respective (Continued)

focal position (fa,fb) in an imaging plane (P) outside the body (2). The second continuously functional optical shape (Cb) is separated from the first continuously functional optical shape (Ca) by an optical discontinuity (Dab) there between.

14 Claims, 9 Drawing Sheets

(51) Int. Cl.
*G01J 3/18* (2006.01)
*G01J 3/12* (2006.01)

HIGH RESOLUTION BROADBAND MONOLITHIC SPECTROMETER AND METHOD

CROSS-REFERENCE TO RELATED APPLICATIONS

This patent application is a U.S. National Phase of PCT International Application No. PCT/NL2017/050004, filed Jan. 6, 2017, which claims priority to European Application No. 16150569.8, filed Jan. 8, 2016, which are both expressly incorporated by reference in their entireties, including any references contained therein.

TECHNICAL FIELD AND BACKGROUND

The present disclosure relates to a monolithic spectrometer, an optical instrument, and a method for spectrally resolving light.

A spectrometer is an instrument used to investigate a property of light as a function of its portion of the electromagnetic spectrum, e.g. for spectrally resolving the light. The term 'light' as used herein includes all forms of electromagnetic radiation such as visible, infrared and/or ultraviolet radiation. Typically, a spectrometer comprises reflective and/or refractive optics for guiding and shaping the light as well as a spectral resolving element such as a grating or prism for diffracting and/or dispersing the light in a wavelength dependent angle. Depending on the angle, different spectral components of the light can be imaged at different locations along a spectral axis in an imaging plane of the spectrometer. A sensor can be arranged for detecting spectral components of the light in the imaging plane.

A monolithic spectrometer comprises a body of solid material shaped to guide the light along an optical path inside the body. The material of the body is transparent at least to the wavelengths of light for which the spectrometer is intended to be used. For example, depending on the intended use, the material can be transparent to visible and/or infrared and/or ultraviolet radiation. The body shape comprises optical surfaces to transmit, reflect, shape (e.g. collimate or focus), refract (e.g. bend or disperse), and/or diffract the light as it travels along the optical path. Optionally, the optical surfaces may be coated, e.g. with a reflective material, or an optical piece such as a mirror or grating can be adhered to the optical surface to provide or aid the optical function of the surface. Advantages of a monolithic spectrometer over a regular spectrometer may include compactness, stability, and/or manufacturability.

For example, U.S. Pat. No. 8,345,226 describes various embodiments of monolithic spectrometers including Czerny-Turner, crossed Czerny-Turner, and Fastie-Ebert configurations. For example, European patent application 2,857,810 A1 describes a monolithic spectrometer of a particularly compact design.

It is desired to improve the known monolithic spectrometer to cover a broad wavelength range while maintaining adequate spectral resolution.

SUMMARY

Accordingly, the present disclosure provides a monolithic spectrometer for spectrally resolving light. The spectrometer comprises a body of solid material having optical surfaces configured to guide the light along an optical path inside the body. The optical surfaces comprise an entry surface configured to receive the light to enter into the body as an entry beam directed along a first part of the optical path. The optical surfaces comprise a collimating surface configured to receive the entry beam directed along the first part of the optical path and to reflect the entry beam as a collimated beam directed along a second part of the optical path. The optical surfaces comprise a grating surface configured to receive the collimated beam directed along the second part of the optical path and to reflect diffracted beams in different directions along a third part of the optical path according to a wavelength dependent diffraction angle.

The optical surfaces comprise a segmented focusing surface. The segmented focusing surface comprises a first focusing section configured to receive at least part of a first diffracted beam of the diffracted beams. The first diffracted beam has a first wavelength and a corresponding first diffraction angle. The first focusing section has a first continuously functional optical shape to focus, along one part of the optical path, all received parts of the first diffracted beam with the first wavelength onto a first focal position in an imaging plane outside the body. The segmented focusing surface comprises a second focusing section configured to receive at least part of a second diffracted beam of the diffracted beams. The second diffracted beam has a second wavelength, distinct from the first wavelength, and a corresponding second diffraction angle distinct from the first diffraction angle. The second focusing section has a second continuously functional optical shape to focus, along another part of the optical path, all received parts of the second diffracted beam onto a second focal position in the imaging plane. The second focal position is distinct from the first focal position. The second continuously functional optical shape is separated from the first continuously functional optical shape by an optical discontinuity there between.

Different parts of the segmented focusing surface receive parts of the diffracted beam of light. These different parts of the diffracted beam may comprise different ranges of wavelengths. Segmentation of the focusing surface allows independent adaption of the imaging position for the different wavelength ranges. Specifically, the segmentation allows to adapt the imaging position of one range of wavelengths closer together with respect to another range of wavelengths. By segmenting the focusing surface with one or more optical discontinuities along the length of its curved surface, distinct focusing sections can be formed that can project respective parts of the spectrum along a single line. Shifting of the imaging position (where one range of wavelengths is projected with respect to another range) can be independent of the image size (spatial extent of each of the projected wavelength range e.g. on a sensor). Therefore, wavelengths ranges that are relatively far apart in the electromagnetic spectrum can be imaged together on a relatively small (single-line) sensor without deteriorating the resolution. Accordingly, a compact monolithic spectrometer is provided that can cover a broad wavelength range while maintaining adequate spectral resolution.

Neighbouring focusing sections may form a single segmented surface of the spectrometer. Each focusing section is separated from the next first focusing section by an optical discontinuity there between. This means that the continuous optical function of the first focusing section is distinct from the continuous optical function of the second focusing section. For example an optical discontinuity can be formed by a kink in a surface between the first focusing section and the second focusing section. By having neighbouring focusing sections sloped towards one another the focal points of the respective focusing sections can be brought closer together compared to the same light falling on a single continuous focusing section.

Two, three, or more focusing sections can be provided to form a segmented focusing surface with respective discontinuities there between. Each focusing section may be adapted to image a different range of wavelengths next to each other in the same imaging plane, e.g. on the same sensor. When a different part of a collimated beam falls on different focusing sections, only one of the focusing section may be adapted to image the light in the imaging plane while the other section may direct the light for which it is not intended elsewhere in particular away from the imaging plane so as not to interfere with measurement on the sensor.

Different segments of the focusing surface may receive different parts of the diffracted beam depending on the diffraction angle. Depending on a width of the diffracted beams, the wavelength ranges received on different focusing segments may receive wavelength ranges that partially overlap with wavelength ranges of neighbouring focusing segments. Depending on the spectral signature to be measured it can be desired to filter some or all of the overlapping wavelength ranges so that they do not interfere when being projected onto a sensor. For example, one or more band filters may be configured to filter these overlapping wavelength ranges from the light before entering the spectrometer. Alternatively, or in addition, the overlapping ranges may also be filtered by software, e.g. by fitting a known or estimated part of the overlapping spectrum. Alternatively, or in addition, for a spectrum that is relatively sparse, i.e. with spectral features far apart, no filtering may be required. For example, the spectrometer may be configured for spectrally resolving a sparse spectrum of light comprising isolated spectral features with a substantially featureless (e.g. constant) spectral background there between. For example, a spectrum obtained by Laser Induced Breakdown Spectroscopy (LIBS) may be characterized by a relatively featureless background, e.g. white light, with a few isolated peaks on top at specific frequencies corresponding to the spectral signature of elements to be analysed. The featureless or constant background may thus be subtracted from the measured signal, e.g. where the featureless background projected by a first focusing section overlaps the spectral features projected by a second focusing section, and vice versa.

Because the focusing sections lie next to each other, some may be at a relatively large angle with respect to the imaging plane. By providing the sections that are at a larger angle with a smaller surface (smaller numerical aperture), a respective depth of focus may be larger. This may improve resolution for steep angles of incidence. In addition it will be appreciated that a relatively large focusing section may collect relatively more light than a small focusing section and hence provide a larger signal on the detector. Accordingly, it is preferred to choose a relatively large section that provides close to normal incidence of the focused light on the image plane, particularly if the signal in the wavelength range handled by the said large section is relatively small. Vice versa, a wavelength range with a high signal may be handled by a relatively small focusing section at relatively higher angle of incidence with respect to the image plane.

Preferably, the optical path is substantially confined to a (two-dimensional) optical plane of the body. The (imaginary) optical plane is typically transverse or normal to the optical surfaces, e.g. coinciding with the respective planes of reflection or refraction. This allows a more compact thickness spectrometer. Alternatively, or in addition, the spectra of multiple light spots can be resolved in parallel, e.g. wherein each light spot is provided at the entry surface at a different height along the thickness of the spectrometer. For example, the monolithic spectrometer may have a larger thickness to accommodate different light spots. Alternatively, or in addition, a stack of individual spectrometers can be provided. The spectrum of each incoming light beam can be easily measured by a sensor with sensor elements (pixels) arranged on a single line. The respective spectra of multiple light spots can be measured in parallel, e.g. using a two-dimensional array or grid of sensor elements (pixel array).

The spectrometer as described herein may find application in an optical system. The optical system may comprise or couple to further optical and/or electrical components. For example a detector comprising a plurality of detecting elements is arranged in the imaging plane of the spectrometer for measuring the spectrally resolved light. Furthermore, a light source and/or relay may be used for providing light to the entry surface of the spectrometer. Alternatively or in addition, a light source may be used to illuminate a sample, wherein the illumination of the sample results in the light to be spectrally resolved by the spectrometer. For example, a laser can be used to perform LIBS. Light from the source and/or sample may e.g. be guided by optical fibres. Advantageously multiple fibres can be placed in on a line transverse to the tangential plane of the spectrometer body to increase the signal. Also a processor may be comprised in the instrument to control and read out the other components and/or analyse the spectrum. Advantageous properties of the spectrometer, such as bandwidth, resolution, compactness, robustness, and low manufacturing cost, may similarly apply to the optical instrument as a whole. This opens up the possibility for a wide variety of portable optical instruments performing detailed spectral measurements of a broad wavelength range.

According to a further aspect of the present disclosure, the monolithic spectrometer as describe herein may be used in a method for spectrally resolving light. The method comprises receiving the light to enter into the body at the entry surface, reflecting the entry beam as a collimated beam by means of the collimating surface, reflecting diffracted beams in different directions according to a wavelength dependent diffraction angle by means of the grating surface, and receiving at least part of a first diffracted beam onto the first focusing section of the spectrometer and receiving at least part of a second diffracted beam onto the second focusing section of the spectrometer. The first diffracted beam has a first wavelength and corresponding first diffraction angle and the second diffracted beam has a second wavelength, distinct from the first wavelength, and a corresponding second diffraction angle distinct from the first diffraction angle.

Optionally, by providing one or both of the entry and/or exit surfaces with a curvature, these surfaces may be accommodated to provide a desired refractive function at the interface of the monolithic body, e.g. to either enhance or prevent diffraction at the interface. In one example, the exit surface may be provided with a curvature to act as a lens to increase focusing of outgoing light. In another example, the entry surface may be curved e.g. for at least partially collimating an incoming beam.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Unless otherwise defined, all terms (including technical and scientific terms) used herein have the same meaning as commonly understood by one of ordinary skill in the art to which this invention belongs as read in the context of the description and drawings. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

The invention is described more fully hereinafter with reference to the accompanying drawings, in which embodiments of the invention are shown. This invention may, however, be embodied in many different forms and should not be construed as limited to the embodiments set forth herein. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion.

Figure 1:
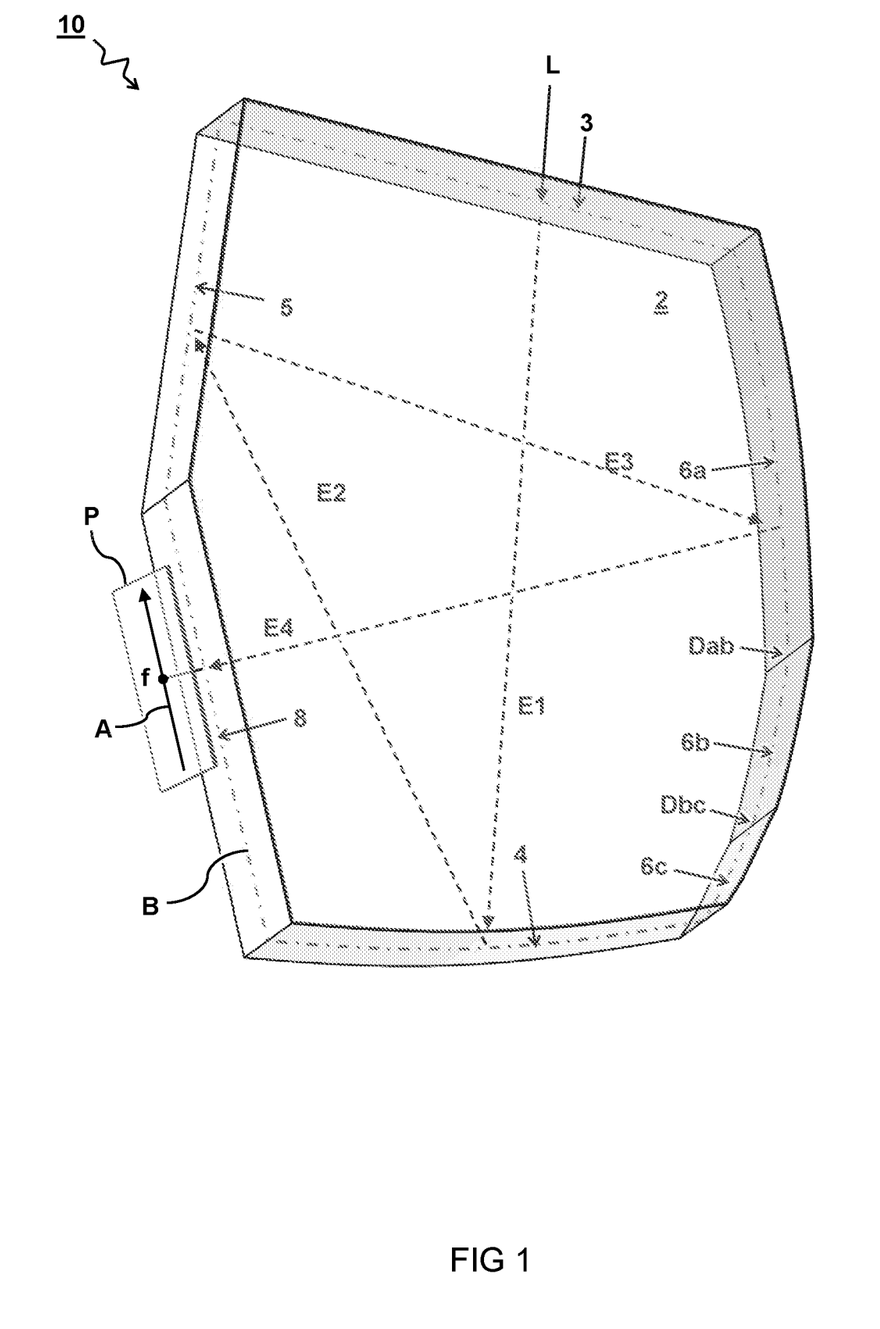
FIG. 1 schematically shows a perspective view of an embodiment of a monolithic spectrometer.

FIG. 1 schematically shows a perspective view of an embodiment of a monolithic spectrometer 10 for spectrally resolving light L.

The spectrometer 10 comprises a body 2 of solid material having optical surfaces configured to guide the light L along an optical path E1,E2,E3,E4 inside the body 2. As shown, the optical path E1,E2,E3,E4 may follow a two dimensional plane B through the body 2. In the embodiment, the optical path is directed along a two-dimensional plane B of the body 2 transverse to the optical surfaces 3,4,5,6,8. For example, the two-dimensional plane B may be defined as an optical plane that intersects the body 2 transverse to the optical surfaces 3,4,5,6,8.

An entry surface 3 is configured to receive the light L to enter into the body 2 as an entry beam directed along a first part E1 of the optical path. A collimating surface 4 is configured to receive the entry beam directed along the first part E1 of the optical path and to reflect the entry beam as a collimated beam directed along a second part E2 of the optical path. In a collimated beam the rays of light are substantially parallel, in this case at least in an in-plane direction of the optical path, e.g. within five degrees or less. This has an advantage that the light rays have similar or the same angle of incidence on the grating surface 5.

Preferably, the beam is also collimated in a thickness direction of the spectrometer, e.g. by means of an out-of-plane curvature of the collimating surface 4 and/or other surfaces of the spectrometer. Alternatively, or in addition, the beam may already be partially or wholly collimated in one or more directions before entering the spectrometer. For example an external collimating lens may be used. Thickness of the monolithic spectrometer may be decreased by adding for example a separate or integrated cylindrical lens to the entry of the spectrometer. The cylindrical lens may also be formed by a curvature of the entry surface, e.g. having a curvature in an out of plane direction.

A grating surface 5 is configured to receive the collimated beam directed along the second part E2 of the optical path and to reflect a diffracted beam in a direction along a third part E3 of the optical path according to a wavelength dependent diffraction angle. A focusing section 6a is configured to receive at least part of the diffracted beam and to focus the beam along a fourth part E4 of the optical path through an exit surface 8 towards a focal point f outside the body 2. This may include a focal point at an interface of the body.

In the embodiment shown, the focusing surface of the spectrometer 10 follows a discontinuous curvature that is segmented and comprises additional focusing sections 6b and 6c. The focusing sections 6a,6b,6c are separated from each other by discontinuities Dab and Dbc of the curved surface there between. Each focusing section has a distinct curvature or freeform optical shape and corresponding different optical function i.e. to focus light entering the section at a respective angle to a distinct focal point.

As shown, the optical discontinuity Dab extends transverse to the plane B of the body. In other words, the focusing sections 6a, 6b, and 6c lie adjacent each other in the plane B of the body. Accordingly, the one ore more optical discontinuities separates the focusing sections to receive the diffracted light across different ranges of the wavelength dependent diffraction angle. In other words, the second focusing section 6b is adjacent the first focusing section 6a in the plane B of the body. Accordingly, the focusing sections 6a,6b are adjacent to receive different (ranges of) diffraction angles.

In a preferred embodiment, the second focusing section 6b is sloped towards the first focusing section 6a in the plane B of the body compared to an extrapolated continuous optical curvature of the first focusing section beyond the optical discontinuity Dab to reduce a distance between the respective focal positions of the focusing sections 6a,6b along a spectral axis in the imaging plane P compared to a single continuously functional optical shape.

Preferably, the focal positions of the respective focusing sections 6a,6b are projected along a line forming a spectral axis A of the spectrally resolved light L in an imaging plane P of the spectrometer. For example, the spectral axis A lies at an intersection between the image plane P and a central plane of the body, e.g. the plane B extended outside the body 2. In other words, the first focusing section 6a and the second focusing section 6b have adjacent focal positions in the plane B. Accordingly, the first focusing section 6a and the second focusing section 6b are configured to project their respective images in adjacent positions, i.e. adjacent along the spectral axis A.

Figure 2:
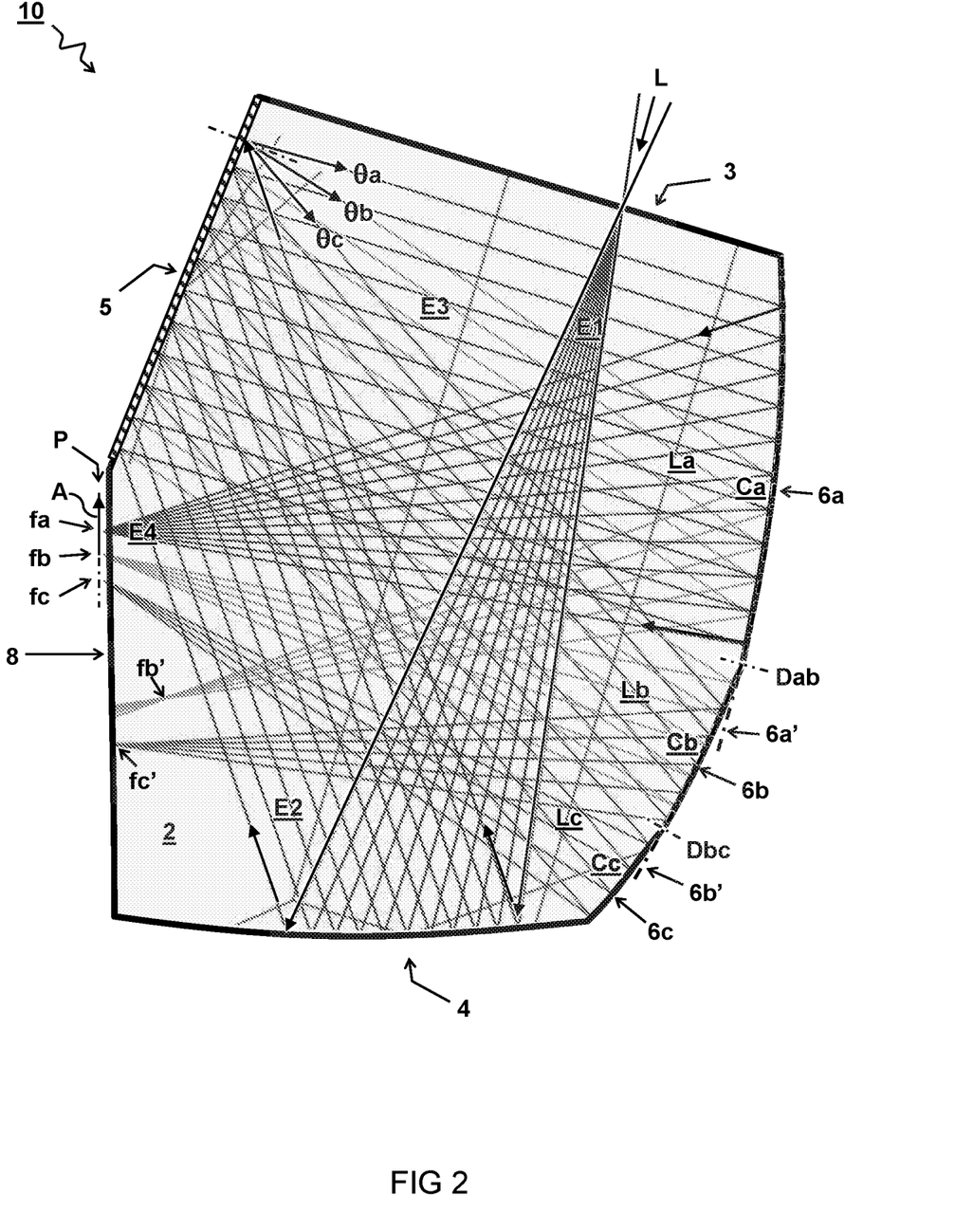
FIG. 2 shows a cross-section side view of a ray trace simulation of optical paths in the embodiment of the monolithic spectrometer.

FIG. 2 shows a cross-section side view of a ray trace simulation of optical paths in the embodiment of the monolithic spectrometer as shown in FIG. 1.

Figure 3:
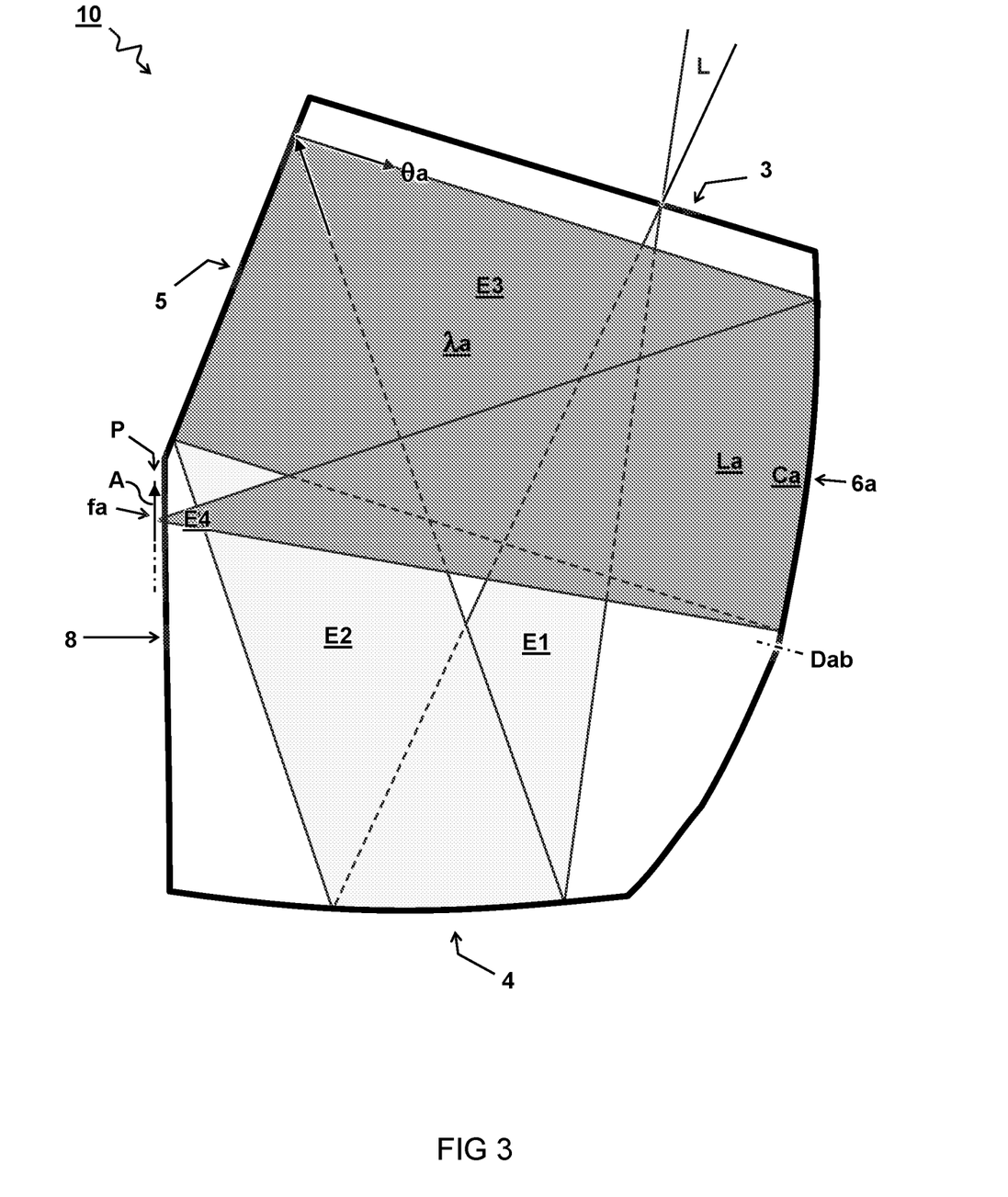
FIGS. 3-5 schematically show cross-section side views of beams having different wavelengths traversing the monolithic spectrometer.
Figure 4:
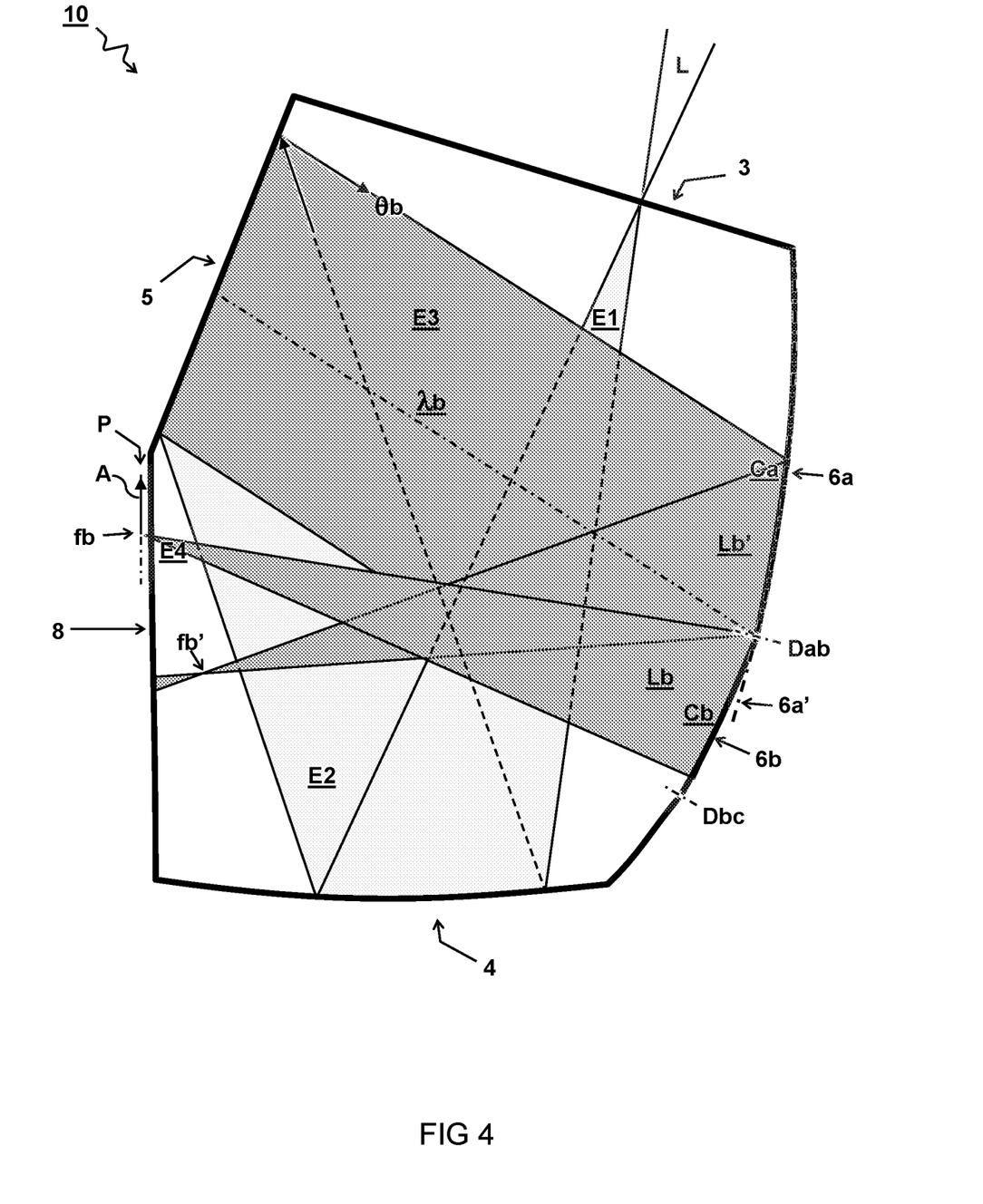
Figure 5:
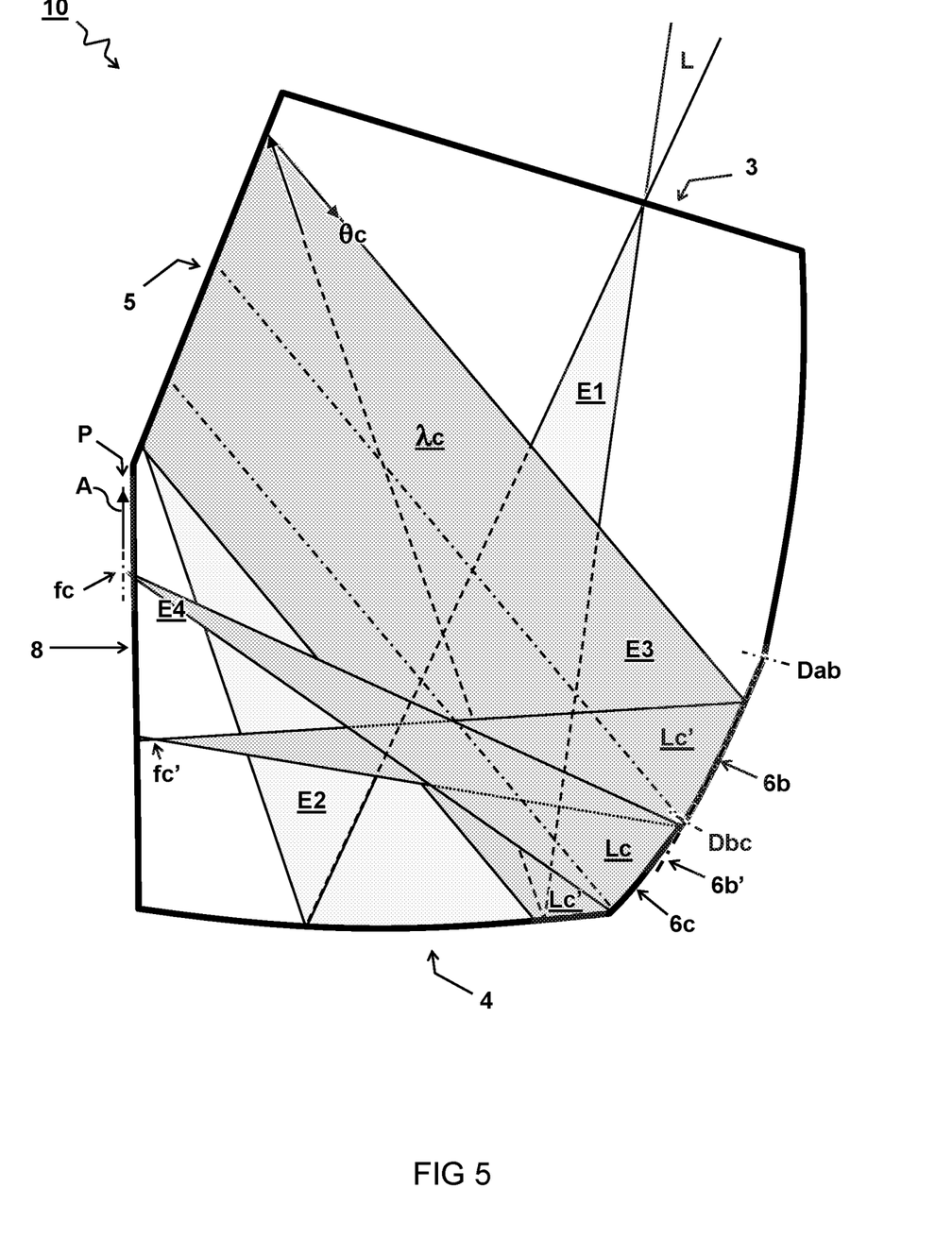

FIGS. 3-5 schematically show cross-section side views of beams having different wavelengths $\lambda a$, $\lambda b$, $\lambda c$ traversing the body 2 of the monolithic spectrometer 10.

The figures illustrates an example of how the grating surface 5 may be configured to receive the collimated beam directed along the optical path E2 and to reflect diffracted beams La, Lb, Lc in different directions along a respective the optical path E3 according to diffraction angle $\theta a$, $\theta b$, $\theta c$ depending on a respective wavelength $\lambda a$, $\lambda b$, $\lambda c$.

In one embodiment, as illustrated particularly in FIGS. 2 and 3, a first focusing section 6a is configured to receive at least part of a first diffracted beam La of the diffracted beams. The first diffracted beam La has a first wavelength $\lambda a$ and corresponding first diffraction angle $\theta a$. The first focusing section 6a has a first continuously functional optical shape Ca to focus, along a fourth part E4 of the optical path, all received parts of the first diffracted beam La onto a first focal position fa in an imaging plane P outside the body 2.

In another or further embodiment, as illustrated particularly in FIGS. 2 and 4, a second focusing section 6b is configured to receive at least part of a second diffracted beam Lb of the diffracted beams. The second diffracted beam Lb has a second wavelength $\lambda b$, distinct from the first wavelength $\lambda a$, and a corresponding second diffraction angle $\theta b$ distinct from the first diffraction angle $\theta a$. The second focusing section 6b has a second continuously functional optical shape Cb to focus, along another fourth part E4 of the optical path, all received parts of the second diffracted beam Lb onto a second focal position fb in the imaging plane P. The second focal position fb is distinct from the first focal position fa. The second continuously functional optical shape Cb is separated from the first continuously functional optical shape Ca by an optical discontinuity Dab there between.

In another or further embodiment, as illustrated particularly in FIGS. 2 and 5, a third focusing section 6c is configured to receive at least part of a third diffracted beam Lc of the diffracted beams. The third diffracted beam Lb has a third wavelength $\lambda c$, distinct from the first and second wavelengths $\lambda a$, $\lambda b$, and a corresponding third diffraction angle $\theta c$ distinct from the first and second diffraction angles $\theta a$, $\theta b$. The third focusing section 6c has a third continuously functional optical shape Cc to focus all received parts of the third diffracted beam Lc onto a third focal position fc in the same imaging plane P as the first and second focal positions fa,fb. The third focal position fc is distinct from the first and second focal positions fa,fb. The third continuously functional optical shape Cc is separated from the second continuously functional optical shape Cb by a second optical discontinuity Dbc there between.

Accordingly, each focusing section 6a,6b,6c has a respective continuously functional optical shape Ca,Cb,Cc. This means that the shape of a particular focusing section has a continuous curvature and all parts of the curvature work together to provide the optical function, i.e. imaging the incoming beam of diffracted light in the imaging plane. A first continuously functional optical shape Ca may be distinguished from a neighbouring second continuously functional optical shape Cb by an optical discontinuity Dab in the curvature of the surface there between. The optical discontinuity Dab separates the optical function of the curvature Ca from the optical function of the curvature Cb.

In one embodiment, the one or more optical discontinuities Dab, Dbc are formed by a kink or bend in a surface between the respective focusing section 6a and 6b and/or 6b and 6c. FIG. 4 illustrates one embodiment, wherein the second focusing section 6b is sloped towards the first focusing section 6a compared to an extrapolated continuous optical curvature 6a' of the first focusing section 6a beyond the optical discontinuity Dab. FIG. 5 illustrates another or further embodiment, wherein the third focusing section 6c is sloped towards the second focusing section 6b compared to an extrapolated continuous optical curvature 6b' of the second focusing section 6b beyond the optical discontinuity Dbc.

Preferably, the sloping together of the first and second focusing sections 6a,6b causes a distance between of the first and second focal position fa,fb to decrease compared to a single continuously functional optical shape 6a,6a'. For example, as illustrated in FIG. 4, a part Lb' of the second diffracted beam falling on the first continuously functional optical shape Ca is directed to another position fb' that is separate from the second focal position fb of the part Lb of the second diffracted beam falling on the second continuously functional optical shape Cb.

Accordingly, in the embodiments, each focusing section 6a,6b,6c is configured to receive a respective collimated light beam La,Lb,Lc from the grating surface 5 at a different angle $\theta a$, $\theta b$, $\theta c$ and focus the respective light beam at a respective focal position fa,fb,fc in a flat imaging plane P. Typically, an exit surface 8 is arranged in the optical path between the focusing sections 6a,6b,6c and the imaging plane P to have the light E4 exit the body 2.

A simple baseline for the design of the focusing sections may use a set of off-axis parabolas, or spherical surfaces to bring the different wavelengths to a focus at the detector. An optimized system can be defined for three distinct wavelengths $\lambda a$, $\lambda b$, $\lambda c$ by choosing a suitable set of angles and focal distances for each mirror. For each mirror the position (two variables), an angle and the off-axis distance; for the entrance point, grating and detector there is a position and angle. After setting up a coarse design this may be optimized using optimization algorithms. When optimizing the system, polynomials can be used which mix the spherical and parabolic (or paraboloidal) shape, allowing to reach both desired bandwidth and resolution. Also other freeform optically functional shapes may be used.

For example, when the first focusing section 6a is adapted for a particular wavelength $\lambda a$, the first focusing section 6a may have a continuous parabolic curvature Ca to form an off-axis parabolic mirror wherein the direction of the incoming beam La is along an optical axis of the parabolic mirror and the point "fa" is the focal point of the parabolic mirror. More generally, when the first focusing section 6a is configured to image a range of wavelengths $\Lambda a$ around the first wavelength $\lambda a$, the continuous shape Ca may be adapted e.g. to correct for the optical aberration called "coma" caused by light of different wavelengths within the range $\Lambda a$ having slightly different angle with respect to the optical axis of the focusing section. For example, the focusing section may be adapted as a freeform surface defined by a continuous curvature having both parabolic and spherical components.

Another design freedom that exists in this design is the fact that the F-number can be chosen per channel. In the figures, it is shown that the first channel (La) has more throughput, which may also contribute to the amount of signal. Interestingly, the F-number can be different in x and y-direction, and the F-number reduction is only used in the spectral direction. This can make it easier to obtain the resolution requirement, because there are less aberrations. Alternatively, or in addition, when optimizing the system, some aberrations can also be compensated using the first mirror surface 4. In particular the most demanding channel can benefit from this design freedom.

In one aspect the figures illustrate a method for spectrally resolving light L. The method comprises providing a monolithic spectrometer 10 comprising a body 2 of solid material having optical surfaces configured to guide the light L along an optical path E1,E2,E3,E4 inside the body 2. The method comprises receiving the light L to enter into the body 2 as an entry beam directed along a first part E1 of the optical path. The method comprises receiving the entry beam directed along the first part E1 of the optical path and reflecting the entry beam as a collimated beam directed along a second part E2 of the optical path. The method comprises receiving the collimated beam directed along the second part E2 of the optical path and reflecting diffracted beams La,Lb,Lc in different directions along a third part E3 of the optical path according to a wavelength λa,λb,λc dependent diffraction angle θa, θb, θc.

In one embodiment, the method comprises receiving at least part of a first diffracted beam La onto a first focusing section 6a of the spectrometer 10, the first diffracted beam La having a first wavelength λa and corresponding first diffraction angle θa, the first focusing section 6a having a first continuously functional optical shape Ca to focus, along a fourth part E4 of the optical path, all received parts of the first diffracted beam La onto a first focal position fa in an imaging plane P outside the body 2. In another or further embodiment, the method comprises receiving at least part of a second diffracted beam Lb onto a second focusing section 6b of the spectrometer 10, the second diffracted beam Lb having a second wavelength λb, distinct from the first wavelength λa, and a corresponding second diffraction angle θb distinct from the first diffraction angle θa, the second focusing section 6b having a second continuously functional optical shape Cb to focus, along another fourth part E4 of the optical path, all received parts of the second diffracted beam Lb onto a second focal position fb in the imaging plane P, the second focal position fb being distinct from the first focal position fa. The second continuously functional optical shape Cb is separated from the first continuously functional optical shape Ca by an optical discontinuity Dab there between.

Figure 6:
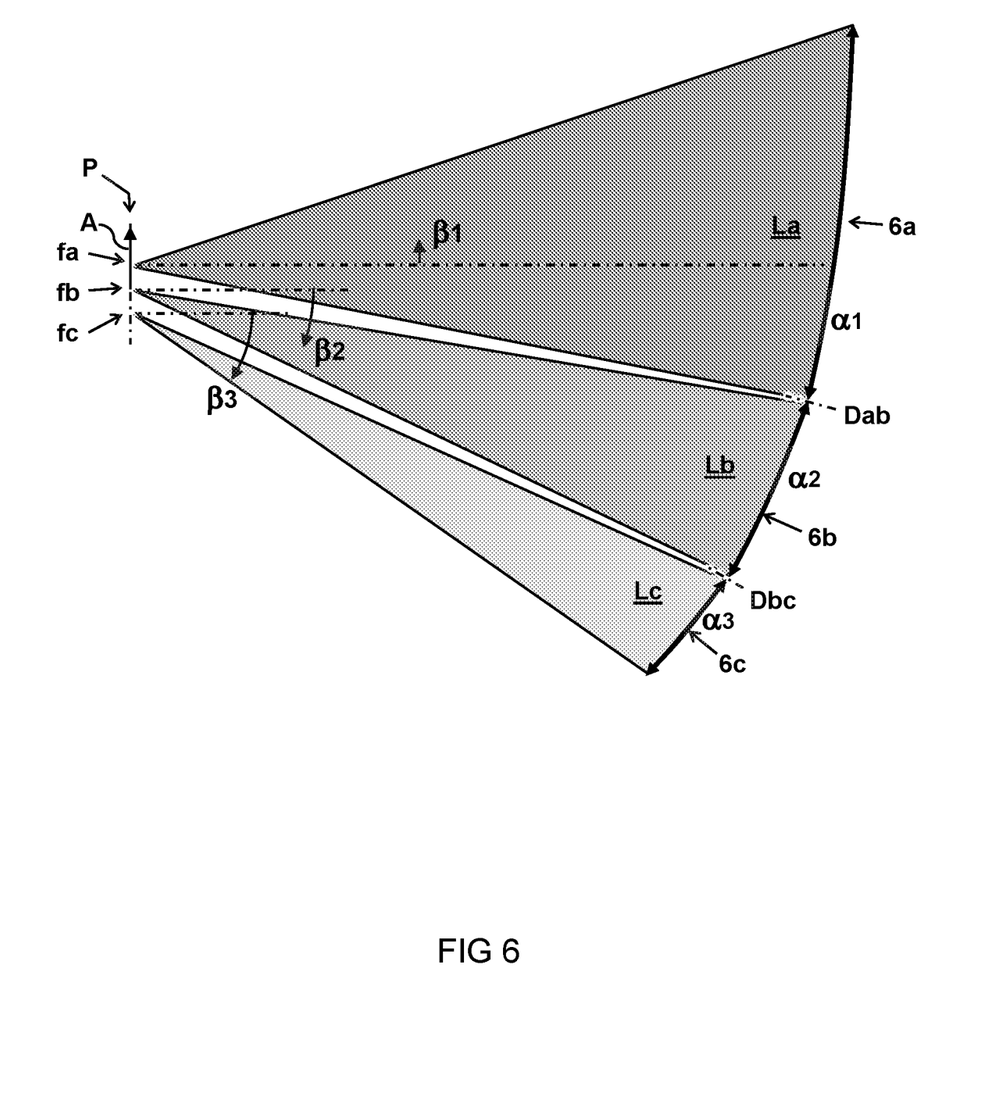
FIG. 6 illustrates beams of light impinging the focal plane from different angles and numerical aperture.

FIG. 6 illustrates beams of light La,Lb,Lb, as discussed above, originating from respective focusing sections 6a,6b, 6b having respective numerical aperture α1, α2, α2, wherein the light impinges the focal plane P from different (average) angles of incidence β1, β2, β3.

It may be observed that each focusing section can have a slightly different focal distance, because the mean distance between the detector and the second mirror varies. Given a particular orientation and position of the grating and the detector, the angles describing the mirrors can be calculated. To obtain the desired resolution the surface may be optimized to correct for aberrations. When using off-axis parabolas typically a perfect focus is typically obtained only for those rays which are parallel to the optical axis of the parabola. This may be the case for one wavelength. For each channel a certain wavelength range may be needed. For these wavelengths the system may suffer from the aberration called coma. These are particularly large for systems with a low F-number, which this design aims at achieving.

In one embodiment, the first focusing section 6a spans a larger surface and/or has a larger numerical aperture than the second focusing section 6b. In another or further embodiment, light La focused onto the imaging plane P by the first focusing section 6a has an average angle of incidence β1 that is smaller than an average angle of incidence β2 of light Lb focused onto the imaging plane P by the second focusing section 6b, wherein the first focusing section 6a spans a larger opening angle α1 than an opening angle α2 of the second focusing section 6b.

Another aberration that may need correction is the fact that the focus plane for each distinct color is at an angle with respect to the detector plane, whereas in a conventional spectrometer this is usually at normal incidence. This aberration is also related to the F-number of the system, as a high F-number system has a smaller depth of focus. So the resolution of a channel can be increased by reducing the F-number of that channel alone. Another design consideration is that the channel that preferably has the largest bandwidth has its focus plane in line with the detector plane. In the design in FIG. 1, this is optimized for the channels of the first and second focusing sections 6a and 6c. However, this may be less optimal for the channel of the third focusing section 6c, where the resolution may be less important.

Figure 7A:
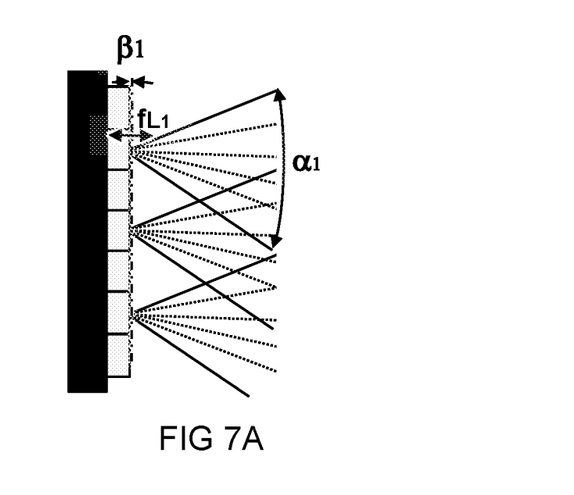
FIGS. 7A-7C schematically illustrate the effect of depth of focus on resolution at different angles.
Figure 7B:
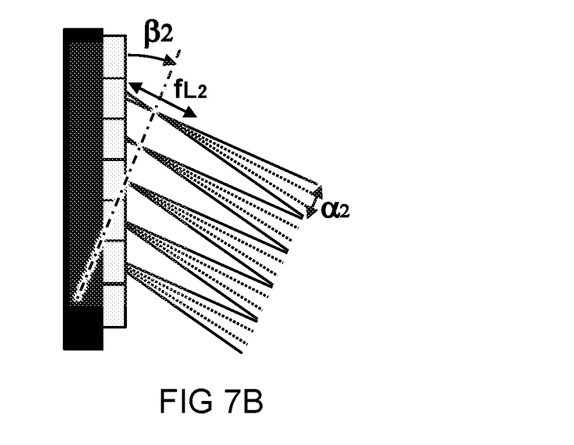
Figure 7C:
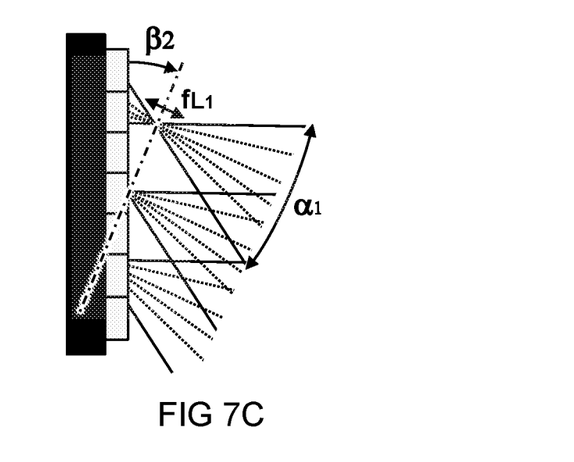

FIGS. 7A-7C schematically illustrate the effect of depth of focus on resolution at different angles. In FIG. 7a, light falling onto the detector originates from a focusing section having a relatively large opening angle α1. This causes the beam waist to have a relatively short focusing length fL1 (depth of focus). This is not such a problem since the average angle of incidence β1 is also relative small. In FIG. 7b, the angle of incidence β2 is relatively large. However, the corresponding depth of focus fL2 is relatively long due to the smaller opening angle α1. Accordingly, the light falling onto the detector pixels is still relatively well separated. In FIG. 7c, the depth of focus fL1 is relatively short and the angle of incidence β2 is relatively large. This may negatively affect the resolution, e.g. the light spots falling on the detector may be larger than the pixels when moving away from the focal plane at a angle with respect to the detector plane.

Accordingly, it is found preferable that light impinging the imaging plane P from a focusing section at a larger angle of incidence β2 is provided by the respective focusing section with a longer depth of focus fL2 than a depth of focus fL1 of light impinging the imaging plane P from a focusing section at a smaller angle of incidence β1.

Figure 8A:
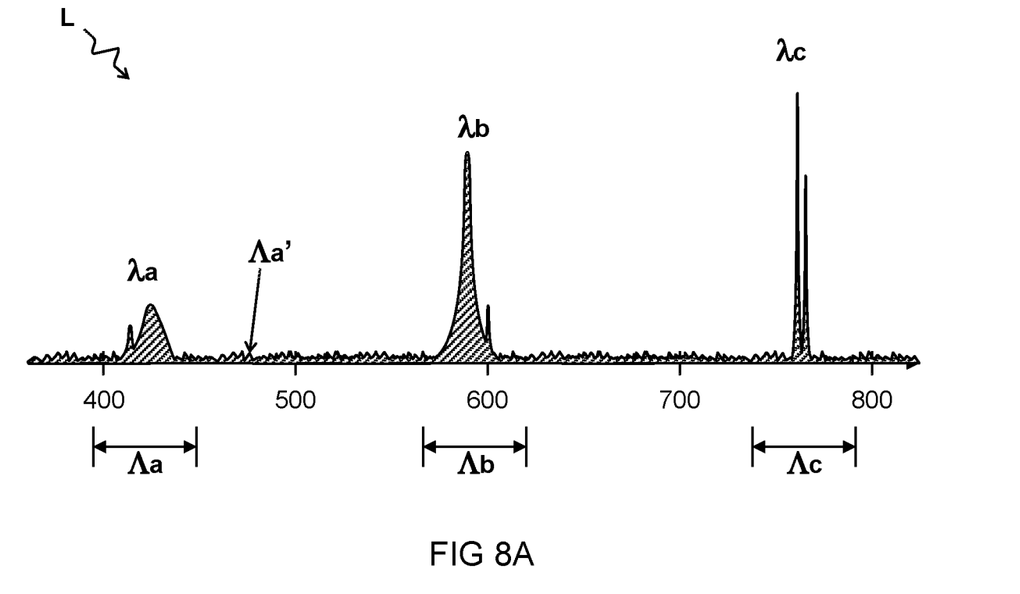
FIG. 8A schematically shows an example spectrum of light entering the spectrometer.
Figure 8B:
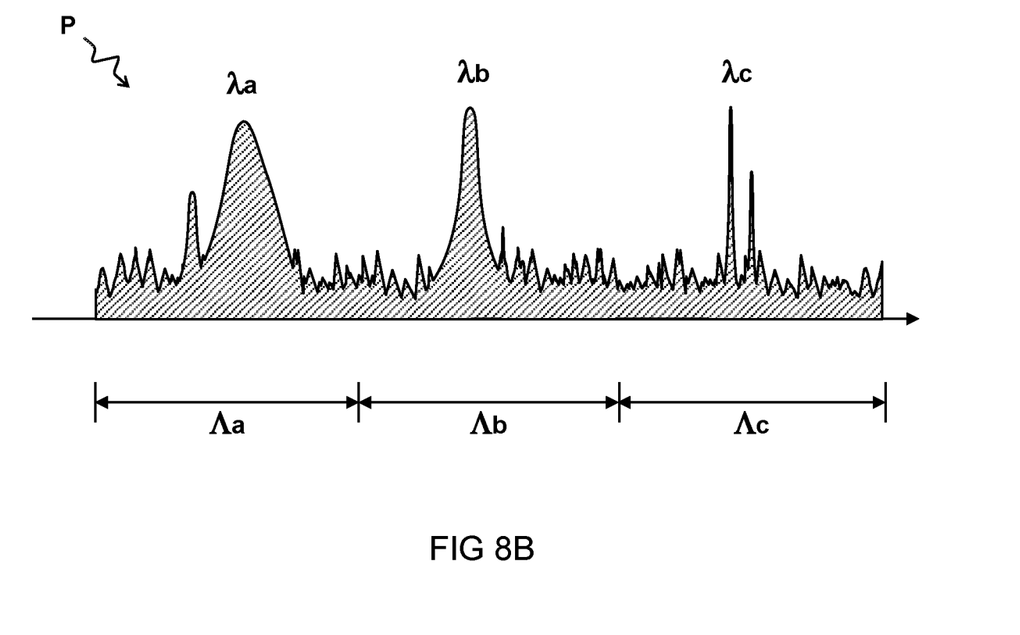
FIG. 8B schematically illustrates the resulting spectrum measured after traversing the spectrometer.

FIG. 8A schematically shows an example spectrum of light L entering a spectrometer as describe herein. FIG. 8B schematically illustrates the resulting spectrum that may be measured in the imaging plane P of the spectrometer.

In one embodiment, the first focusing section is configured to image a first continuous wavelength range Λa around the first wavelength λa onto the imaging plane P and the second focusing section is configured to image a second continuous wavelength range Λb around the second wavelength λb onto the imaging plane P. In another or further embodiment, the second continuous wavelength range Λb is separated in wavelength from the first continuous wavelength range Λa in the incoming light L but imaged directly adjacent to the first continuous wavelength range Λa in the image plane P. In particular, the wavelength ranges Λa, Λb may be imaged adjacent along the spectral axis A. In another or further embodiment, an image of a wavelength range imaged by the first focusing section partially overlaps an image of a wavelength range imaged by the second focusing section. For example, a featureless or substantially constant background Λa' adjacent the wavelength range Λa may overlap the wavelength range Λb in the image on the detector (and vice versa). Such background Λa' may be subtracted when processing the data. Alternatively, or in addition, wavelengths corresponding to the background Λa' may be filtered before reaching the spectrometer or detector. Also one or more additional wavelength ranges Λc around respective wavelengths λc may be imaged.

Figure 9:
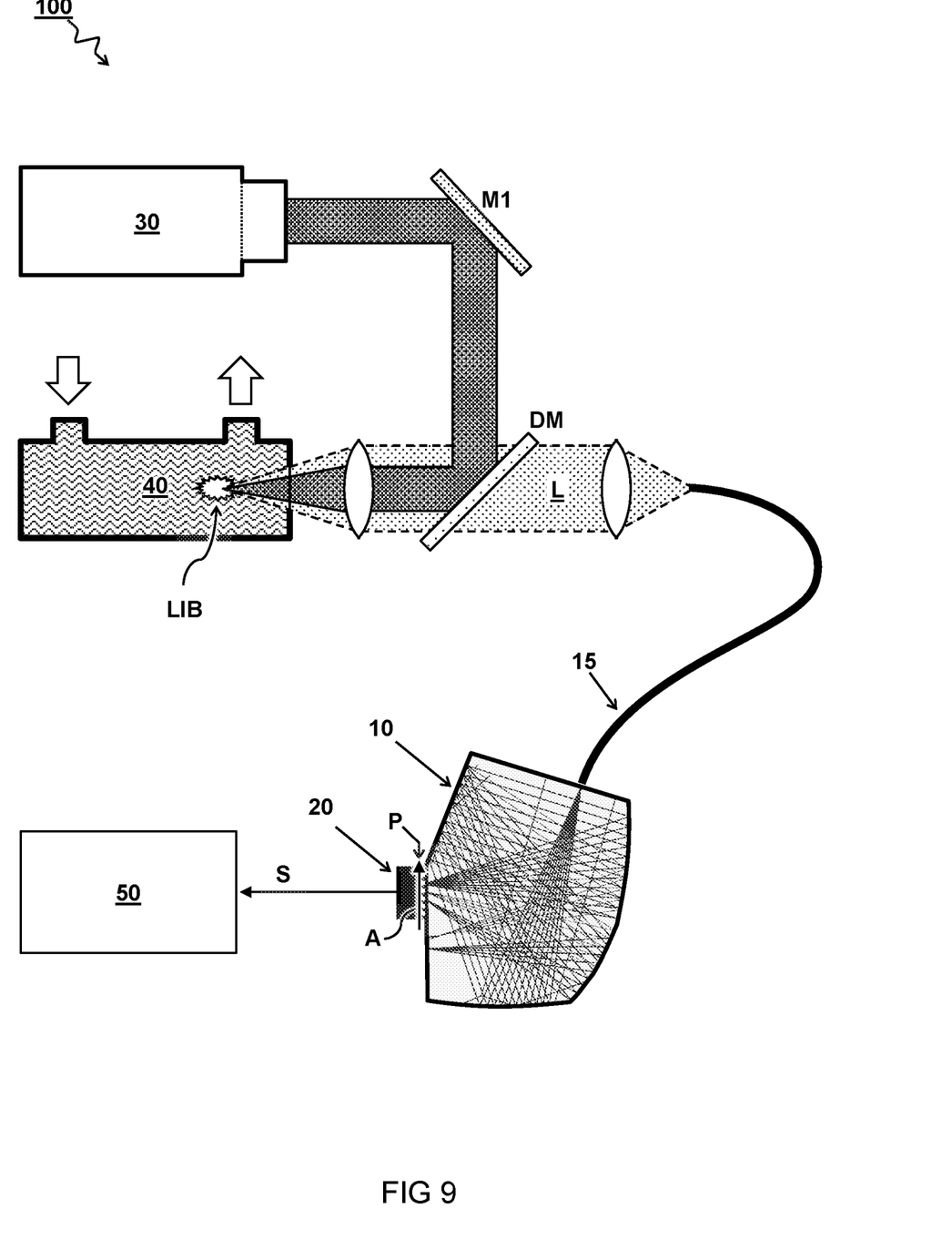
FIG. 9 schematically illustrates an optical system comprising the monolithic spectrometer.

FIG. 9 schematically illustrates an optical system 100 comprising the spectrometer 10 for spectrally resolving light L as described herein. In one embodiment, the optical system 100 comprises a light source 30 and/or relay 15 for providing the light L to the entry surface 3 of the spectrometer 10. In another or further embodiment, the optical system (100) comprises a detector 20 comprising a plurality of detecting elements arranged along a spectral axis A in the imaging plane P of the spectrometer 10 for measuring the spectrally resolved light L.

In one embodiment, the light source 30 is configured to illuminate a sample 40, the illumination of the sample 40 resulting in the light L to be spectrally resolved by the spectrometer 10. For example the laser light may be steered by mirror M1, dichroic mirror DM and a lens into the sample 40 causing laser induced breakdown (LIB). The resulting light L may travel back through the dichroic mirror DM to be focused in a fibre optic cable 15. In this way the light L may be fed into the spectrometer 10. The spectrometer may resolve the light L as described herein and image the spectrum in the image plane P onto a detector 20 placed thereat. The detector 20 may generate a signal S which may be processed by a controller 50.

It will be appreciated that the present systems and methods are particularly suitable for detecting sparse spectral signatures, i.e. wherein spectral features are separated in the wavelength domain by sections with minimal spectral features, e.g. constant and/or zero signal. In one embodiment the measured light comprises a spectrum of isolated spectral features at the wavelengths to be resolved with a substantially constant spectral background there between. In some implementations, the light L received by the spectrometer 10 is a spectrum resulting from laser induced breakdown spectroscopy (LIBS). For example, the optical system 100 is configured to perform LIBS of the sample 40. Also other optical instruments may be envisaged for measuring optical properties, e.g. using Raman or other spectroscopic techniques. Also combinations of LIBS and Raman spectra can be envisaged. Alternatively, or in addition, in one embodiment, the optical system 100 comprises one or more band filters configured to filter wavelength ranges from the light L, e.g. disposed between the spectrometer 10 and the detector 20 and/or before entering the spectrometer 10. The filtered wavelength ranges may otherwise cause overlapping spectral features on the detector 20. Alternatively, no band filters are needed, e.g. because the spectrum is relatively sparse or essentially consists of known spectral features that can be filtered or fitted e.g. using software processing.

While example embodiments were shown for a high bandwidth and resolution design monolithic spectrometer, also alternative ways may be envisaged by those skilled in the art having the benefit of the present disclosure for achieving a similar function and result. The spectrometer in the shown embodiments has a segmented focusing surface consisting of three focusing segments. Alternatively, the spectrometer may essentially consist of two focusing segments, or more than three focusing segments, depending on the application. For example four, five, or more focusing sections may be present, each configured to image a respective wavelength range. Alternatively, or in addition, optical and electrical components may be combined or split up into one or more alternative components. The various elements of the embodiments as discussed and shown offer certain advantages, such as providing a compact design with excellent resolution, in particular for LIBS spectroscopy. Of course, it is to be appreciated that any one of the above embodiments or processes may be combined with one or more other embodiments or processes to provide even further improvements in finding and matching designs and advantages. It is appreciated that this disclosure offers particular advantages to broadband optical instruments, and in general can be applied for any application wherein a compact spectrometer can be used.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A monolithic spectrometer for spectrally resolving light, the monolithic spectrometer comprising a body of solid material having optical surfaces configured to guide the light along an optical path inside the body, the optical surfaces comprising:
   an entry surface configured to receive the light to enter into the body as an entry beam;
   a collimating surface configured to receive the entry beam and to reflect the entry beam as a collimated beam;
   a grating surface configured to receive the collimated beam and to reflect diffracted beams in different directions according to a wavelength dependent diffraction angle;
   a first focusing section configured to receive at least part of a first diffracted beam of the diffracted beams, the received at least part of the first diffracted beam having a first wavelength, the first focusing section having a first continuously functional optical shape to focus all received parts of the first diffracted beam onto a first focal position in an imaging plane outside the body;
   a second focusing section configured to receive at least part of a second diffracted beam of the diffracted beams, the received at least part of the second diffracted beam having a second wavelength that is distinct from the first wavelength, the second focusing section having a second continuously functional optical shape to focus all received parts of the second diffracted beam onto a second focal position in the imaging plane, the second focal position being distinct from the first focal position, wherein the second continuously functional optical shape is separated from the first continuously functional optical shape by an optical discontinuity there between; and an exit surface of an exiting part of the light exiting the body, the exit surface being arranged in the optical path inside the body between:
the first focusing section and the second focusing section, and
the imaging plane;

wherein the optical path inside the body defines a two dimensional plane of the body transverse to the optical surfaces, wherein the optical discontinuity extends transverse to the two dimensional plane of the body, wherein light focused onto the imaging place by the first focusing section has an average angle of incidence that is smaller than an average angle of incidence of light focused onto the imaging place by the second focusing section, and wherein the first focusing section spans a larger opening angle than an opening angle of the second focusing section.

2. The monolithic spectrometer according to claim 1, wherein the second focusing section is sloped towards the first focusing section in the two dimensional plane of the body compared to an extrapolated continuous optical curvature of the first focusing section beyond the optical discontinuity to reduce a distance between the first focal position and the second focal position along a spectral axis in the imaging plane compared to a single continuously functional optical shape.

3. The monolithic spectrometer according to claim 1, wherein the optical discontinuity separates the focusing sections to receive diffracted light across different ranges of the wavelength dependent diffraction angle.

4. The monolithic spectrometer according to claim 1, wherein the first focal position and the second focal position of the respective first focusing section and the second focusing section are projected along a line forming a spectral axis of spectrally resolved light in the imaging plane.

5. The monolithic spectrometer according to claim 1, further comprising:
a third focusing section configured to receive at least part of a third diffracted beam of the diffracted beams, the received at least part of the third diffracted beam having a third wavelength that is distinct from the first wavelength and the second wavelength, the third focusing section having a third continuously functional optical shape to focus all received parts of the third diffracted beam onto a third focal position in the imaging plane, wherein the third continuously functional optical shape is separated from the second continuously functional optical shape by a second optical discontinuity there between.

6. The monolithic spectrometer according to claim 1, wherein each of the first focusing section and the second focusing section is configured to receive a respective light beam from the grating surface at a different angle and focus the respective light beam at a respective focal position in the imaging plane.

7. The monolithic spectrometer according to claim 1, wherein a part of the second diffracted beam falling on the first continuously functional optical shape is directed to another position that is separate from the second focal position of the part of the second diffracted beam falling on the second continuously functional optical shape.

8. The monolithic spectrometer according to claim 1, wherein the first focusing section spans a larger surface and/or has a larger numerical aperture than the second focusing section.

9. The monolithic spectrometer according to claim 1, wherein light impinging the imaging plane from a focusing section at a larger angle of incidence is provided by a respective one of the first focusing section and the second focusing section having a longer depth of focus than a depth of focus of light impinging the imaging plane from a focusing section at a smaller angle of incidence.

10. The monolithic spectrometer according to claim 1, wherein the first focusing section is configured to image a first continuous wavelength range around the first wavelength onto the imaging plane and the second focusing section is configured to image a second continuous wavelength range around the second wavelength onto the imaging plane;
wherein the second continuous wavelength range is separated in wavelength from the first continuous wavelength range but is imaged directly adjacent to the first continuous wavelength range in the image plane.

11. The monolithic spectrometer according to claim 1, wherein an image of a wavelength range imaged by the first focusing section partially overlaps an image of a wavelength range imaged by the second focusing section.

12. The optical system according to claim 11, further comprising one or more band filters configured to filter wavelength ranges from the light.

13. An optical system for spectrally resolving light, the system comprising:
a monolithic spectrometer for spectrally resolving light, the monolithic spectrometer comprising a body of solid material having optical surfaces configured to guide the light along an optical path inside the body, the optical surfaces comprising:
an entry surface configured to receive the light to enter into the body as an entry beam;
a collimating surface configured to receive entry beam and to reflect the entry beam as a collimated beam;
a grating surface configured to receive the collimated beam and to reflect diffracted beams in different directions according to a wavelength dependent diffraction angle;
a first focusing section configured to receive at least part of a first diffracted beam of the diffracted beams, the received at least part of the first diffracted beam having a first wavelength, the first focusing section having a first continuously functional optical shape to focus all received parts of the first diffracted beam onto a first focal position in an imaging plane outside the body;
a second focusing section configured to receive at least part of a second diffracted beam of the diffracted beams, the received at least part of the second diffracted beam having a second wavelength that is distinct from the first wavelength, the second focusing section having a second continuously functional optical shape to focus all received parts of the second diffracted beam onto a second focal position in the imaging plane, the second focal position being distinct from the first focal position, wherein the second continuously functional optical shape is separated from the first continuously functional optical shape by an optical discontinuity there between; and an exit surface of an exiting part of the light exiting the body, the exit surface being arranged in the optical path inside the body between:
the first focusing section and the second focusing section, and
the imaging plane;

a light source and/or relay for providing the light to the entry surface of the monolithic spectrometer; and a detector comprising a plurality of detecting elements arranged in the imaging plane of the monolithic spectrometer for measuring the spectrally resolved light, wherein the optical path inside the body defines a two dimensional plane of the body transverse to the optical surfaces, wherein the optical discontinuity extends transverse to the two dimensional plane of the body, wherein light focused onto the imaging plane by the first focusing section has an average angle of incidence that is smaller than an average anile of incidence of light focused onto the imaging plane by the second focusing section, and wherein the first focusing section spans a larger opening angle than an opening angle of the second focusing section.

14. A method for spectrally resolving light, the method comprising providing a monolithic spectrometer comprising a body of solid material having optical surfaces configured to guide the light along an optical path inside the body;

receiving the light to enter into the body as an entry beam directed along a first part of the optical path;

receiving the entry beam directed along the first part of the optical path and reflecting the entry beam as a collimated beam directed along a second part of the optical path;

receiving the collimated beam directed along the second part of the optical path and reflecting diffracted beams in different directions along a third part of the optical path according to a wavelength dependent diffraction angle;

receiving at least part of a first diffracted beam of the diffracted beams onto a first focusing section of the monolithic spectrometer, the received at least part of the first diffracted beam having a first wavelength and corresponding first diffraction angle, the first focusing section having a first continuously functional optical shape to focus, along a fourth part of the optical path, all received parts of the first diffracted beam onto a first focal position in an imaging plane outside the body;

receiving at least part of a second diffracted beam of the diffracted beams onto a second focusing section of the monolithic spectrometer, the received at least part of the second diffracted beam having a second wavelength, distinct from the first wavelength, and a corresponding second diffraction angle distinct from the first diffraction angle, the second focusing section having a second continuously functional optical shape to focus, along another fourth part of the optical path, all received parts of the second diffracted beam onto a second focal position in the imaging plane, wherein the second focal position being is distinct from the first focal position, wherein the second continuously functional optical shape is separated from the first continuously functional optical shape by an optical discontinuity there between, wherein the optical path defines a two dimensional plane of the body transverse to the optical surfaces, wherein the optical discontinuity extends transverse to said plane of the body, wherein light focused onto the imaging plane by the first focusing section has an average angle of incidence that is smaller than an average angle of incidence of light focused onto the imaging place by the second focusing section, and wherein the first focusing section spans a larger opening angle than an opening angle of the second focusing section.

* * * * *